United States Patent [19]

Kubota et al.

[11] Patent Number: 5,070,728
[45] Date of Patent: Dec. 10, 1991

[54] THROTTLE SENSOR

[75] Inventors: Masanori Kubota, Nakaminato; Sadayasu Ueno, Katsuta, both of Japan

[73] Assignees: Hitachi, Ltd., Tokyo; Hitachi Automotive Eng. Co., Ltd., Katsuta, both of Japan

[21] Appl. No.: 581,301

[22] Filed: Sep. 12, 1990

[30] Foreign Application Priority Data

Sep. 20, 1989 [JP] Japan .................................. 1-242251

[51] Int. Cl.5 .......................................... G01M 19/00
[52] U.S. Cl. .................................. 73/118.1; 338/184
[58] Field of Search ....................... 73/118.1; 123/494; 338/184, 199, 197, 315

[56] References Cited

U.S. PATENT DOCUMENTS

| | | | |
|---|---|---|---|
| 4,392,375 | 7/1983 | Eguchi et al. | 73/118.1 |
| 4,616,504 | 10/1986 | Overcash et al. | 73/118.1 |
| 4,688,420 | 8/1987 | Minagawa | 73/118.1 |

FOREIGN PATENT DOCUMENTS 99109 9/1980 Japan .

*Primary Examiner*—Jerry W. Myracle
*Attorney, Agent, or Firm*—Antonelli, Terry Stout & Kraus

[57] ABSTRACT

A throttle value spindle (3) is rotatably fixed to a throttle body (1). A recess is provided within the throttle body at one side of the throttle value spindle along the axial direction of the throttle valve spindle. A holder (6) is fixed to the throttle valve spindle within the recess and has brushes (7) at the opposite side of the throttle valve spindle, which rotates together with the throttle valve spindle. Resistors (12) are mounted on a ceramics circuit board (8) fixed on a housing (12). The housing engages with the recess in such a manner that the resistors contact with the brushes. When the brushes slide on the resistors corresponding to the rotation of the throttle value spindle, an electric signal is outputted continuously from the resistors.

11 Claims, 3 Drawing Sheets

THROTTLE SENSOR

FIELD OF THE INVENTION

The present invention relates to a sensor for detecting the rotational angle of a rotary shaft, and more particularly to the structure of a throttle sensor for detecting the rotational angle of the throttle valve spindle of an internal combustion engine.

BACKGROUND OF THE INVENTION

As a prior art throttle sensor, there has been proposed one wherein, as disclosed in Japanese Utility Model Publication No. 99109/1982 published on June 18, 1982 entitled "Throttle open degree detector", a sensor element is of the stand-alone type, and the sensor element including a bearing is mounted on a throttle body, thereby to detect the rotational angle of a throttle valve spindle.

The prior art throttle sensor has been structurally such that, since the sensor element and the throttle body are separated each other, the former has the bearing portion, a joint etc. Therefore, the structure of the sensor element has become complicated causing such problems as a large size and a high cost.

SUMMARY OF THE INVENTION

An object of the present invention is to provide a throttle sensor of small size in which a sensor element does not have a bearing portion and a joint.

In order to accomplish the above object, brushes are mounted on a throttle valve spindle through a holder, a ceramics circuit board which has resistors adapted to come into sliding contact with the brushes is comprised at a position opposing to the brushes, the resistors serving to generate a continuous electric signal in accordance with the rotational angle of the throttle valve spindle, and a housing which holds the ceramics circuit board and which is unitary formed with a lead frame and a connector is detachably fixed to a throttle body.

Moreover, in consideration of the easy assemblage of a sensor element and the holding of the contact pressure between the brushes and the resistors, the brushes are arranged on the outer side of the holder, or the side thereof remote from the throttle body, and the distance between the holder and the resistors is kept constant within a recess of a throttle body.

With the throttle sensor of the present invention, the brushes are mounted on the throttle valve spindle through the holder. Therefore, the sensor element can do away with bearings for receiving the throttle valve spindle and the joint, and the number of components is reduced, thereby to simplify the structure of the sensor element of the throttle sensor.

Besides, the brushes are arranged on the outer side of the holder, or the side thereof remote from the throttle body. This leads to the easiness of the mounting of the housing, and the easiness of the holding of the contact pressure between the brushes and the resistors.

DETAILED DESCRIPTION OF THE PREFERRED EMBODIMENTS

Figure 1:
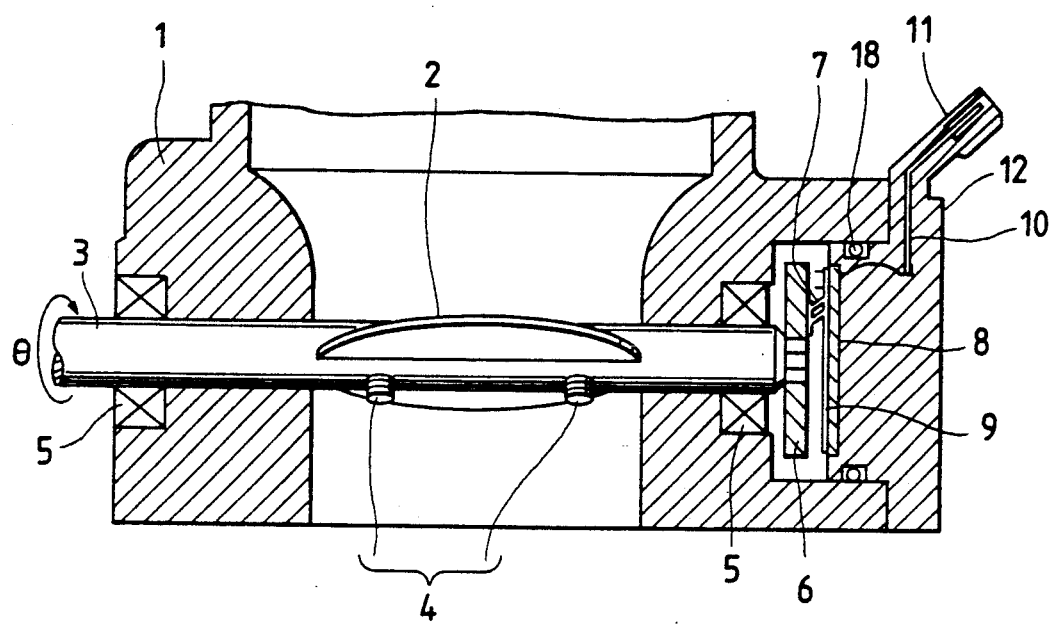
FIG. 1 illustrates a view of the whole construction showing the present invention.
Figure 3:
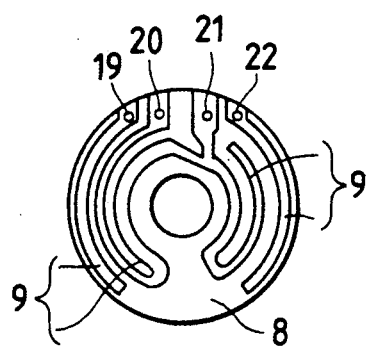
FIG. 3 is a view of resistor patterns.
Figure 4:
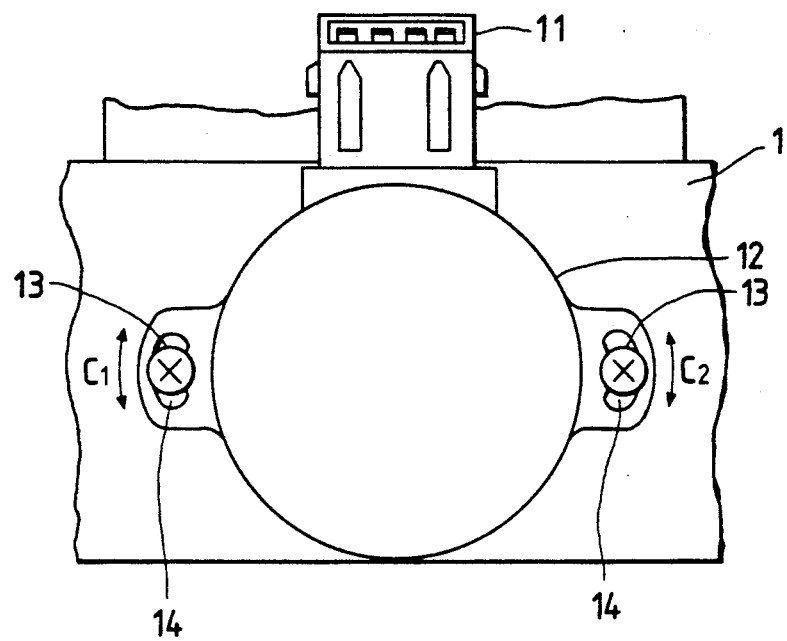
FIG. 4 is a view of the mounting of a housing.

Referring to FIG. 1, numeral 1 designates a throttle body, and a throttle valve 2 is fixed to a throttle valve spindle 3 by screws 4 for fixation. In addition, the throttle valve spindle 3 is rotated in accordance with the tread of an accelerator pedal (not shown), and it is mounted on the throttle body 1 through bearings 5. Numeral 6 designates a holder which is made of a resin or the like, and which is fixed to one end of the throttle valve spindle 3 by press fitting or the like. Numeral 7 indicates a brush which is joined to the holder 6. The brushes 7 slide on resistors 9 shown in FIG. 3 which are arranged on a ceramics circuit board 8 and which are made of electrically conductive plastics, with the rotation of the throttle valve spindle 3. On this occasion, assuming that the side of the throttle body 1 as viewed from the holder 6 having the brushes 7 is the inner side with respect to the holder 6, the brushes 7 are arranged on the outer side of the holder 6, or the side remote from the throttle body. Besides, the ceramics circuit board 8 is arranged orthogonal to the extending direction of the throttle valve spindle 3. Here, the resistors 9 have a power source $V_{cc}$ in the terminal 20 and earth GND connected to the terminal 21, whereby when the brushes 7 slide on the patterns of the resistors 9, a continuous electric signal $V_0$ outputted from the terminal 19 is generated in accordance with the rotational angle 8 of the throttle valve spindle 3, that is, with the rotations of the brushes 7. Numeral 22 denotes the support terminal for supporting the movement of the brush 7. Further, the resistors 9 are connected to a connector 11 through a lead frame 10. Thus, the electric signal $V_0$, power source $V_{cc}$ and earth GND are relayed to or from the exterior of the throttle sensor through the connector 11. The ceramics circuit board 8, lead frame 10 and connector 11 are formed to be unitary with a housing 12. As shown in FIG. 4, the housing 12 is detachably mounted on the throttle body 1 through adjustment slots 14 forming unloaded holes by the use of fitting screws 13.

Figure 2:
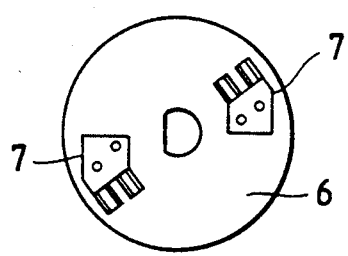
FIG. 2 is a detailed view of a holder and brushes.
Figure 5:
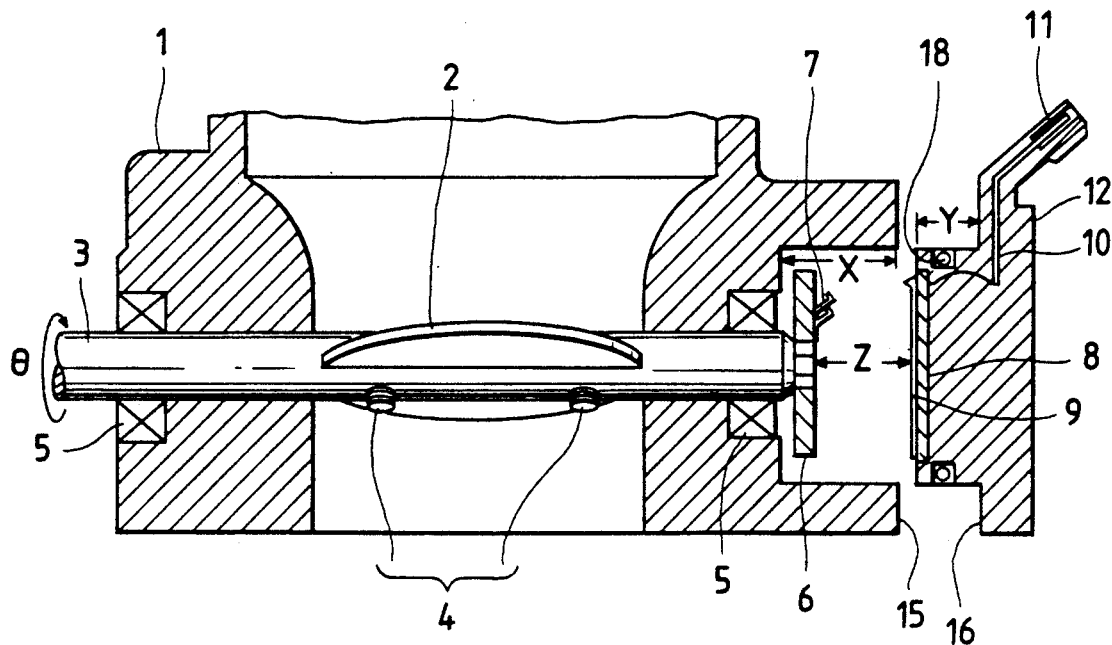
FIG. 5 is a view for explaining the contact method of the brushes, and resistors.

Here, the contact method of the brushes 7 and the resistors 9 will be described with reference to FIG. 5. A recess is provided within the throttle body 1 at one side of the throttle valve spindle 3 along the axial direction of the throttle valve spindle 3 for accommodating the holder 6 which is fixed to one end of the throttle valve spindle 3. The brushes 7 are mounted on the holder 6 as shown in FIG. 2. The protrusion, which is provided for mounting the ceramics circuit board 8 of the housing 12, engages with the recess provided to the throttle body 1. When the protrusion of the housing 12 is engaged with the recess, the resistors 9 contact the brushes 7. The resistors 9 are contacted by the brushes 7, when the throttle valve spindle 3 rotates. Suppose that the depth of the recess is X, and the height of the protrusion is Y. When the protrusion engages with the recess, the distance Z between the holder 6 and the resistors 9 can be expressed by Z=X-Y without respect to the thickness of the holder 6 and the protruded length of the throttle valve spindle 3 from the bottom of the recess to the closest surface of the holder 6 to the bottom. 15 denotes the fitting surface of the throttle body 1 to the housing 12; 16 denotes the filling surface of the housing 12 to the throttle body 1.

Figure 6:
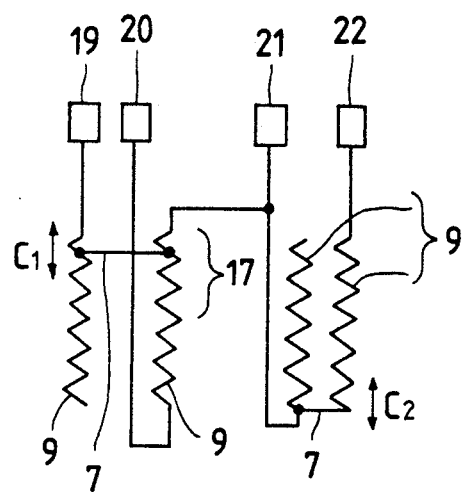
FIG. 6 is a developed plan of the resistors shown in FIG. 3.

Hereunder, we will explain how to adjust the initial value of the rotational angle 8 of the throttle valve spindle 3; namely, the minimum value of the electric signal $V_0$ is expressive of the rotational angle 8 through the fine adjustments of the fitting position of the housing 12 and is obtained by rotating the two adjustment slots 14 around the two fitting screws 13, respectively, referring to FIGS. 4, 6 and 1. When the position of the housing 12 is finely adjusted in $C_1$ and $C_2$ directions as shown in FIG. 4 on the basis of the adjustment slots 14 of the housing 12, the brushes 7 held in sliding contact with the resistors 9 moves on the resistors 7 shown in FIG. 6, whereby the voltage division ratio 17 of resistances is changed to generate the electric signal $V_0$. When the rotational directions $C_1$ and $C_2$ of the adjustment slots 14 shown in FIG. 4 are, for instance, clockwise, the brushes 7 shown in FIG. 6 are moved in the up and down directions, respectively corresponding to the movement of the rotational directions $C_1$ and $C_2$, respectively. FIG. 6 shows the example in which the initial positions of the brushes 7 are on the side of the earth GND, and the minimum value or initial value of the electric signal $V_0$ is finely adjusted. The housing 12 and the throttle body 1 are tightly sealed by an O-ring 18.

According to the embodiment, the brushes 7 are mounted on the throttle valve spindle 3 of the throttle body 1 through the holder 6. Therefore, the throttle sensor has the effect that the sensor element dispenses with bearings for receiving the throttle valve spindle etc., a joint, and so forth. As another effect, the arrangement of the brushes 7 on the outer side of the holder 6 on the side remote from the throttle body leads to the easiness of the mounting of the housing 12 on the throttle body 1 and the easiness of the holding of the contact pressure between the brushes 7 and the resistors 9.

Since the present invention is constructed in such a manner that the throttle body is formed uniformly together with the throttle sensor, it achieves effects as stated below. The brushes are mounted on the throttle valve spindle of the throttle body through the holder, so that bearings for receiving the throttle valve spindle etc., a joint, and so forth as a stand-along type sensor shown by the prior art mentioned before are dispensed with to simplify a sensor structure. Moreover, the arrangement of the brushes on the outer side of the holder, namely on the side remote from the throttle body, leads to the easiness of the mounting of the housing on the throttle body and the easiness of the holding of the contact pressure between the brushes and the resistors.

What we claim is:

1. A contact type throttle sensor for detecting a rotational angle of a throttle valve spindle rotatably mounted in a throttle body of an internal combustion engine comprising:

a holder fixed to one end of said throttle valve spindle and having a brush which rotates along a predetermined path together with said throttle valve spindle;

a circuit board having a resistor mounted thereon for contact with said brush and which is positioned perpendicular to the axial direction of said throttle valve spindle; and a housing holding said circuit board and being furnished with a lead frame and a connector for relaying an electric signal of said resistor, said housing being detachably fixed to said throttle body;

wherein said housing further comprises means for adjusting a position of said brush with respect to the resistor.

2. A contact type throttle sensor according to claim 1, wherein a first surface of said holder is adjacent to said throttle body, said brush being located on a second surface of the holder facing in a direction opposite to said first surface.

3. A contact type throttle sensor according to claim 2, wherein said brushes are located adjacent to a rim of said holder.

4. A contact type throttle sensor according to claim 1, wherein said holder is located within a recess of said throttle body, and said circuit board is fixed to said housing which engages in said recess said recess and said housing being dimensional, whereby said brushes hold a predetermined contact pressure with said resistor when said housing is engaged in said recess.

5. A contact type throttle sensor according to claim 1, wherein said housing forms a unitary structure with said circuit board, said lead frame and said connector.

6. A contact type throttle sensor according to claim 1, wherein said adjusting means comprises adjustment slots for finely adjusting the position of said housing on said throttle body to produce an initial value of the electric signal corresponding to the rotational angle of the throttle valve spindle.

7. A contact type throttle sensor as in claim 6 wherein said at least two adjustment slots comprise unloaded holes.

8. A contact type throttle sensor according to claim 1, wherein said resistors comprises electrically conductive plastic.

9. A contact type throttle sensor as in claim 1, wherein said adjusting means moves said resistor either up or down with respect to said brush.

10. A contact type throttle sensor as in claim 1, wherein said circuit board is ceramic.

11. A contact type throttle sensor for detecting a rotational angle of a throttle valve spindle rotatably mounted in a throttle body of an internal combustion engine comprising:

a holder being fixed to one end of said throttle valve spindle and having a plurality of brushes which rotate along a predetermined path together with said throttle valve spindle;

a circuit board having a plurality of resistors mounted thereon for contact with said plurality of brushes and located on a plane substantially perpendicular to the axial direction of said throttle valve spindle; and a housing holding said circuit board and having a lead frame and a connector for transmitting an electric signal of said resistors, said housing being detachably fixed to said throttle body.

* * * * *